United States Patent
Zhang et al.

(10) Patent No.: US 9,031,316 B2
(45) Date of Patent: May 12, 2015

(54) METHOD FOR IDENTIFYING VIEW ORDER OF IMAGE FRAMES OF STEREO IMAGE PAIR ACCORDING TO IMAGE CHARACTERISTICS AND RELATED MACHINE READABLE MEDIUM THEREOF

(75) Inventors: Tao Zhang, Sunnyvale, CA (US); Shan Liu, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 337 days.

(21) Appl. No.: 13/612,893

(22) Filed: Sep. 13, 2012

(65) Prior Publication Data

US 2013/0266207 A1  Oct. 10, 2013

Related U.S. Application Data

(60) Provisional application No. 61/620,458, filed on Apr. 5, 2012.

(51) Int. Cl.
*G06K 9/00* (2006.01)
*H04N 13/00* (2006.01)

(52) U.S. Cl.
CPC ...... *H04N 13/0007* (2013.01); *H04N 2213/007* (2013.01); *H04N 2013/0081* (2013.01)

(58) Field of Classification Search
CPC .................... G06T 15/00; G06T 15/20; G06T 2207/10012; G06K 9/68
USPC ........... 382/154; 345/419; 348/46, 49, 48, 47, 348/51
See application file for complete search history.

(56) References Cited

U.S. PATENT DOCUMENTS

| | | | |
|---|---|---|---|
| 8,553,029 B2 | 10/2013 | Kim | |
| 2008/0150945 A1* | 6/2008 | Wang et al. | 345/427 |
| 2009/0207238 A1* | 8/2009 | Kim et al. | 348/51 |
| 2010/0103249 A1* | 4/2010 | Lipton et al. | 348/51 |
| 2011/0025829 A1* | 2/2011 | McNamer et al. | 348/50 |
| 2011/0255775 A1* | 10/2011 | McNamer et al. | 382/154 |
| 2011/0292186 A1* | 12/2011 | Okuda et al. | 348/51 |
| 2012/0075419 A1* | 3/2012 | Boisson et al. | 348/43 |
| 2013/0004059 A1* | 1/2013 | Said | 382/154 |
| 2013/0215237 A1* | 8/2013 | Inoue et al. | 348/49 |
| 2013/0294684 A1* | 11/2013 | Lipton et al. | 382/154 |
| 2014/0104268 A1* | 4/2014 | Lipton | 345/419 |
| 2014/0192156 A1* | 7/2014 | Kumai et al. | 348/43 |

FOREIGN PATENT DOCUMENTS

| | | |
|---|---|---|
| CN | 102158723 A | 8/2011 |
| CN | 102187680 A | 9/2011 |

(Continued)

*Primary Examiner* — Stephen R Koziol
*Assistant Examiner* — Shaghayegh Azima
(74) *Attorney, Agent, or Firm* — Winston Hsu; Scott Margo

(57) ABSTRACT

A method for identifying an actual view order of image frames of a stereo image pair includes at least the following steps: receiving the image frames; obtaining image characteristics by analyzing the image frames according to an assumed view order; and identifying the actual view order by checking the image characteristics. In addition, a machine readable medium storing a program code is provided. The program causes a processor to perform at least the following steps for identifying an actual view order of image frames of a stereo image pair when executed by the processor: receiving the image frames; obtaining image characteristics by analyzing the image frames according to an assumed view order; and identifying the actual view order by checking the image characteristics.

16 Claims, 6 Drawing Sheets

(56) References Cited

FOREIGN PATENT DOCUMENTS

| | | |
|---|---|---|
| CN | 102395037 A | 3/2012 |
| WO | 2011066848 A1 | 6/2011 |
| WO | 2011148556 A1 | 12/2011 |

* cited by examiner

METHOD FOR IDENTIFYING VIEW ORDER OF IMAGE FRAMES OF STEREO IMAGE PAIR ACCORDING TO IMAGE CHARACTERISTICS AND RELATED MACHINE READABLE MEDIUM THEREOF

CROSS REFERENCE TO RELATED APPLICATIONS

This application claims the benefit of U.S. provisional application No. 61/620,458, filed on Apr. 5, 2012 and incorporated herein by reference.

BACKGROUND

The disclosed embodiments of the present invention relate to three-dimensional (3D) image/video playback, and more particularly, to a method of identifying a view order of image frames of a stereo image pair according to image characteristics and related machine readable medium thereof.

With the development of science and technology, users are pursing stereoscopic and more real image/video display rather than high quality image/video display. There are two techniques of present stereo image/video display. One is to use a display apparatus, which collaborates with glasses (such as anaglyph glasses, polarization glasses or shutter glasses), while the other one is to use only a display apparatus without any accompanying glasses. No matter which technique is utilized, the main theory of stereo image/video display is to make the left eye and the right eye see different images, thus the brain will regard the different images seen from two eyes as stereo images.

More and more 3D contents are produced and many of them are available from Internet. In the meantime, there are many co-existing formats to store 3D contents. For example, the available 3D formats include horizontal interlaced, checkerboard, over-under, etc. An Internet television (TV) can view image or video contents directly from Internet. In order to support playback of 3D contents, the Internet TV should have the capability of detecting 3D formats.

Some video standard such as Motion Picture Experts Group (MPEG) has newly added support for some 3D formats through tagging. The High-Definition Multimedia Interface (HDMI) 1.4 interfaces also support many popular 3D formats. However, not all popular 3D formats are supported by MPEG standards or HDMI 1.4 interfaces. Most 3D contents on Internet use different kinds of 3D formats, and do not support above MPEG and HDMI 1.4 standards. Besides 3D videos, there exist a large amount of 3D images, which do not have standard ways to store 3D format information in different image types. Hence, the Internet TV needs to automatically distinguish between 2D and 3D image/video contents, and determine 3D formats for 3D contents. The conventional methods can detect 3D formats, but cannot know the view order of image frames in a stereo image pair. That is, the conventional 3D format method does not know which one of the image frames in the stereo image pair is a left view (i.e., a left-eye image frame) and also does not know which one of the image frames in the stereo image pair is a right view (e.g., a right-eye image frame).

It is interesting that most people can see 3D effects even when the playback order of the left view and the right view are switched. However, the 3D effects they perceived are generally weird and will cause eye fatigue quickly. Specifically, it is difficult to identify left or right views since most people can perceive 3D effects from switched left and right views. Mathematically, the operation of switching left and right views changes signs of mathematic formulae. For 3D effects, it means that depth values change signs. That is, close objects will appear far away, and far objects will appear close. However, the sizes of objects in both views are not changed from the switching. The perceived 3D effects are weird since the perceived depth values hint that smaller objects are closer, while the object sizes hint that smaller objects should be further away. Such contradiction of hints will cause eyestrain very fast.

For some 3D formats such as checkerboard pattern, the order to arrange left or right views is specified, while most others are not. There are also no generally accepted rules for the arrangement. As a result, many 3D software packages have the option to arrange the view order of the left view and the right view according to user's preference. As mentioned above, one way to distinguish the left and right views is to tag this information in video files as defined by some standards. Another way is to set it manually by the user, as current software 3D players do. These two kinds of methods apparently are not suitable for viewing 3D video/image contents on Internet from an Internet TV.

Thus, to make 3D viewing experience pleasant, it is important not only to detect the correct 3D format for 3D contents, but also to identify the correct view order of the left and right views.

SUMMARY

In accordance with exemplary embodiments of the present invention, a method of identifying a view order of image frames of a stereo image pair according to image characteristics and related machine readable medium thereof are proposed to solve the above-mentioned problems.

According to a first aspect of the present invention, an exemplary method for identifying an actual view order of image frames of a stereo image pair includes at least the following steps: receiving the image frames; obtaining image characteristics by analyzing the image frames according to an assumed view order; and identifying the actual view order by checking the image characteristics.

According to a second aspect of the present invention, an exemplary machine readable medium storing a program code is provided. The program causes a processor to perform at least the following steps for identifying an actual view order of image frames of a stereo image pair when executed by the processor: receiving the image frames; obtaining image characteristics by analyzing the image frames according to an assumed view order; and identifying the actual view order by checking the image characteristics.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

The main concept of the present invention is to check the image characteristics to identify the view order of image frames of a stereo image pair in an automatic manner, where the stereo image pair may be obtained through any conventional 3D format detection method. Specifically, image characteristics (e.g., parallax characteristics) are derived from processing/analyzing the image frames of the stereo image pair. Hence, the image characteristics (e.g., parallax characteristics) provide information indicative of the view order of image frames. Further details are described as below.

Figure 1:
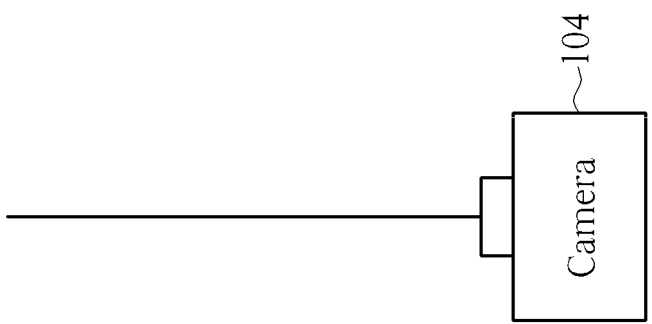
FIG. 1 is a diagram illustrating an exemplary parallel camera configuration.
Figure 1:
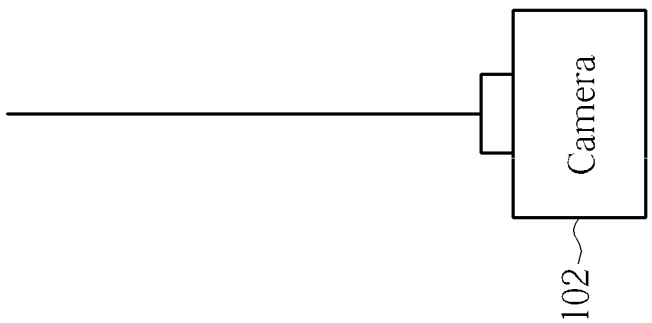
Figure 2:
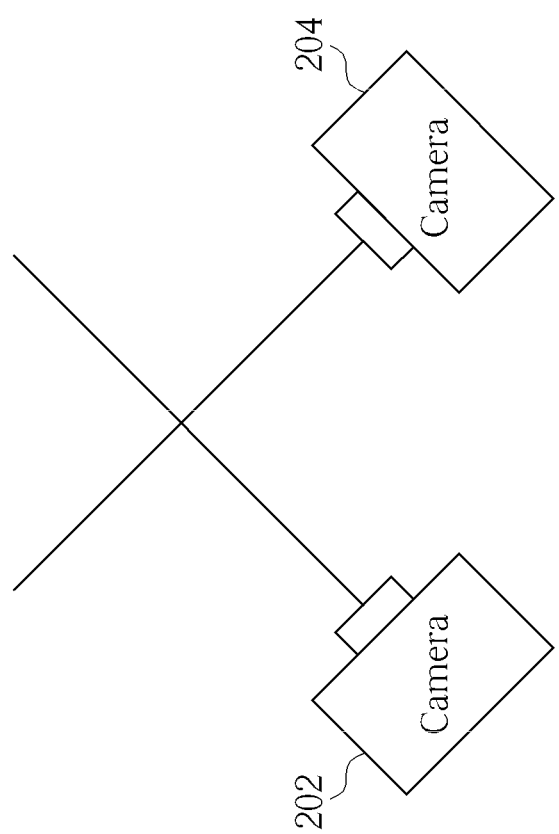
FIG. 2 is a diagram illustrating an exemplary converging camera configuration.

In general, 3D contents are generated by a pair of cameras. Regarding the 3D content production, two camera arrangements are commonly used. One is to use parallel cameras 102, 104, as shown in FIG. 1. The other is to use converging cameras 202, 204, as shown in FIG. 2. Let $X_L$ be the position of a feature point in the left view (i.e., the left-eye image frame) of the stereo image pair, and $X_R$ be the position of the same feature point in the right view (i.e., the right-eye image frame) of the stereo image pair. The parallax value $P(X_L, X_R)$ of the feature point in different image frames of the same stereo image pair may be expressed as below.

$$P(X_L, X_R) = X_R - X_L \quad (1)$$

Figure 3:
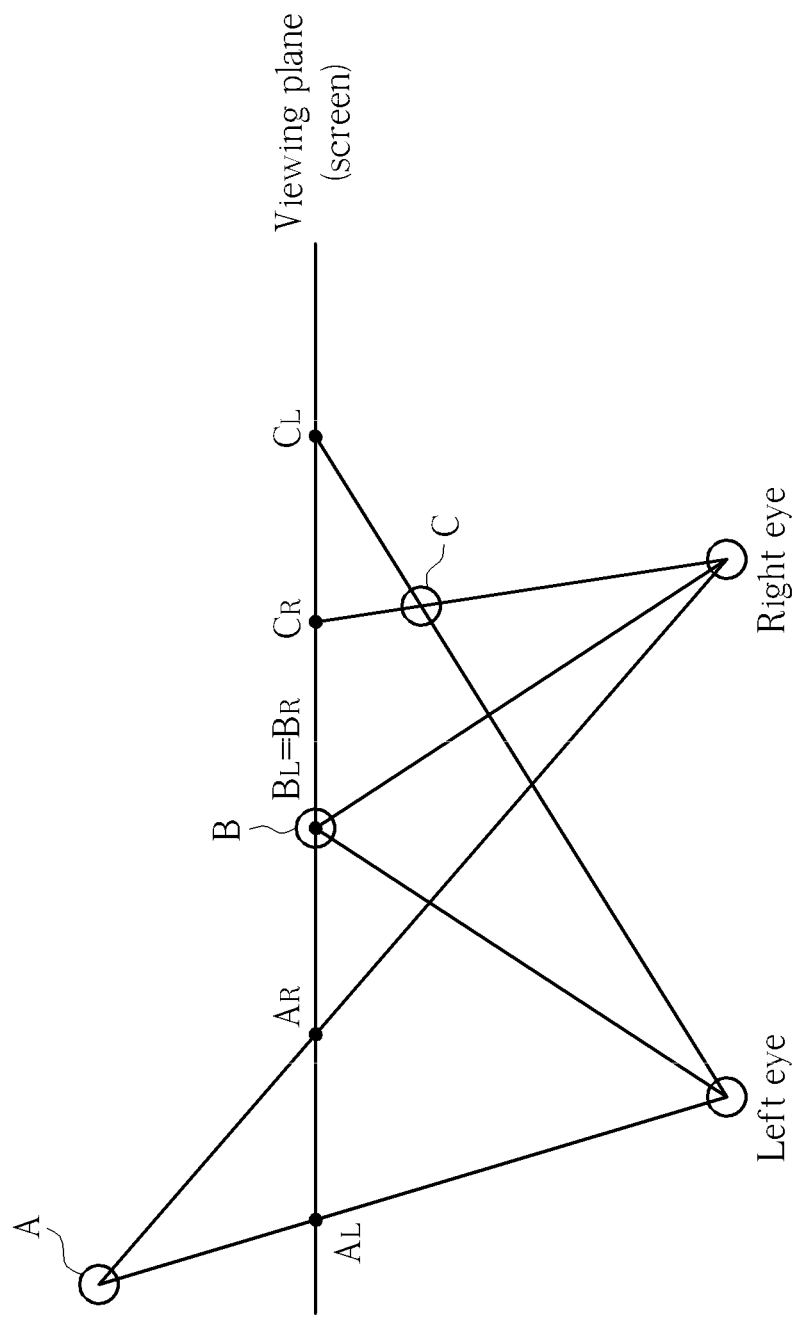
FIG. 3 is a diagram illustrating parallax values and perceived three-dimensional effects.

Hence, based on position values $X_R$ and $X_L$, the parallax value $P(X_L, X_R)$ may be negative, positive or zero. Generally, zero parallax values mean the points are perceived on the screen; positive parallax values mean the points are perceived behind the screen; and negative parallax values mean the points are perceived before the screen. Please re to FIG. 3, which is a diagram illustrating parallax values and perceived 3D effects. The point A has a positive parallax value $P(A_L, A_R)$ due to $X_R = A_R$, $X_L = A_L$ and $A_R > A_L$, and its perceived position is behind the viewing plane (i.e., the display screen); the point B has a zero parallax value $P(B_L, B_R)$ due to $X_R = B_R$, $X_L = B_L$ and $B_R = B_L$, and its perceived position is on the viewing plane (i.e., the display screen); and the point C has a negative parallax value $P(C_L, C_R)$ due to $X_R = C_R$, $X_L = C_L$ and $C_R < C_L$, and its perceived position is before the viewing plane (i.e., the display screen).

As the parallel camera configuration and the converging camera configuration have different arrangements, the distributions of parallax values are different between the parallel camera configuration and the converging camera configuration. Based on this observation, the distributions of signs of the parallax values may be used to distinguish between 3D contents produced by the parallel camera configuration and 3D contents produced by the converging camera configuration. In ideal situations, the parallax values for the parallel camera configuration are all negative parallax values, and there is no zero or positive parallax values for the parallel camera configuration. However, the parallax values for the converging camera configuration may have negative parallax values, zero parallax values and/or positive parallax values, depending upon the 3D contents actually produced.

Another important observation is how to avoid discomfort in 3D content making. In the production of 3D videos or images, a common practice is to limit the "pop-up" effects to avoid eye discomfort. "Pop-up" effects mean when a view sees 3D contents, some objects appear in front of the screen. In the parallel camera configuration, theoretically, almost all pixels/points have negative parallax values, and should be perceived before the viewing plane. Thus, the "pop-up" effects are not obvious due to the fact that there are no pixels with zero or positive parallax values to compare with. Therefore, "pop-up" effects are generally produced by using the converging camera configuration. The "pop-up" effects are attractive in 3D viewing. However, "pop-up" effects make viewer's eyes crossed a lot when seeing them. Excessive and long time use of "pop-up" effects is thus avoided in 3D content production to reduce eye discomfort. This common practice also implies that the distributions of signs of parallax values for the actual converging camera configuration would have the following characteristics: the percentage of positive parallax values is much larger than that of negative parallax values.

Moreover, when converging cameras 202, 204 shown in FIG. 2 are used, the cameras 202, 204 focus on some objects in the scene, which generally implies a large converging angle. This observation is important since a real converging camera configuration can be easily distinguished from a misaligned parallel camera configuration. Ideally, the parallel cameras 102, 104 should be placed in parallel. Unfortunately, parallel cameras 102, 104 may be misaligned to have a very small converging angle due to all kinds of reasons. Misaligned parallel cameras converge at a very far point (out of scene). So it will show parallax value sign distribution similar to that possessed by the parallel cameras instead of the converging cameras.

Since it is assumed that 3D contents are produced for easy and comfort 3D viewing for the viewers, an extreme configuration of converging cameras can also be excluded. In this extreme situation, the converging angle is so large that cameras focus on somewhere very close to the cameras and all pixels in the scene will be put before the viewing plane.

After ruling out some unlikely cases in practical 3D content production, an overview of the sign distribution of parallax values under the correct view order is shown in Table 1.

TABLE 1

| Sign distributions of parallax for parallel and converging cameras (correct view order) | | |
|---|---|---|
| Parallax | Parallel cameras | Converging cameras |
| Positive | 0 | Many |
| Zero | 0 | Many |
| Negative | All | A few |

As can be readily seen from above Table 1, regarding the parallel cameras (or misaligned parallel cameras), the percentage of positive parallax values and zero parallax values is equal to or close to (in the case of existence of errors) zero, while negative parallax values account for all or majority parts; and regarding the converging cameras, the zero parallax values and positive parallax values account for all or majority parts, while negative parallax values account for a small part.

However, if the view order is incorrectly determined, an overview of the sign distribution of parallax values is shown in Table 2.

TABLE 2

Sign distributions of parallax for parallel and converging cameras (incorrect view order)

| Parallax | Parallel cameras | Converging cameras |
|---|---|---|
| Positive | All | A few |
| Zero | 0 | Many |
| Negative | 0 | Many |

As can be readily known from above Table 1 and Table 2, no matter whether the view order is correct or incorrect, the difference of zero parallax value distributions between parallel cameras and converging cameras is large. Thus, it may be used to distinguish between different camera configurations. Besides, as can be readily known from above Table 1 and Table 2, no matter whether the view order is correct or incorrect, the difference of positive and negative parallax value distributions of the same camera configuration is large. Thus, after the camera configuration is determined, the apparent different distribution patterns between positive and negative parallax values may be used to verify the view order of the left view and the right view. For better understanding of technical features of the present invention, several examples of automatic identification of the left view and the right view are provided as below.

Figure 4:
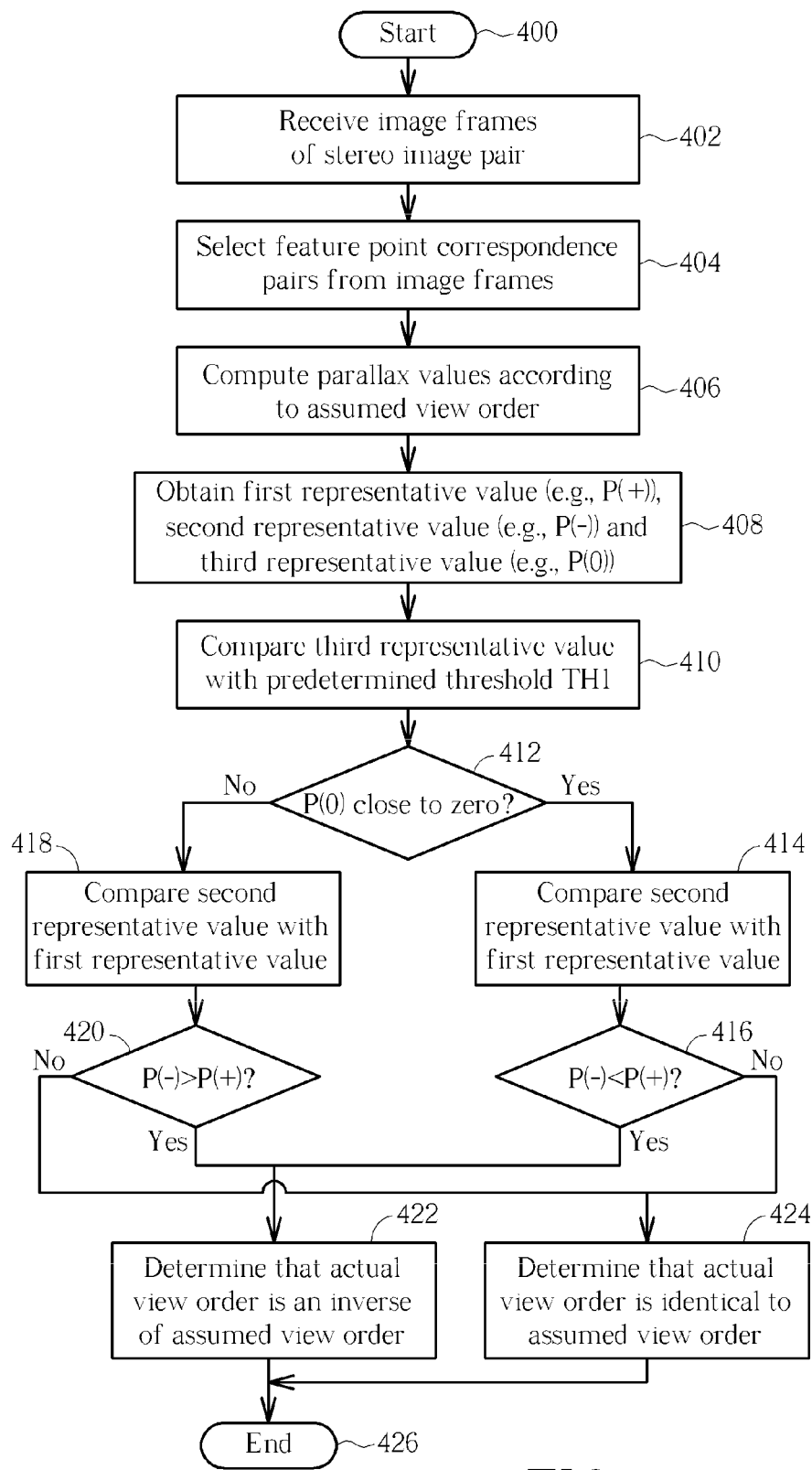
FIG. 4 is a flowchart illustrating a method of identifying a view order of images frames of a stereo image pair according to a first embodiment of the present invention.

Please refer to FIG. 4, which is a flowchart illustrating a method of identifying a view order of images frames of a stereo image pair according to a first embodiment of the present invention. If the result is substantially the same, the steps are not required to be executed in the exact order shown in FIG. 4. The exemplary automatic identification scheme of the present invention may include following steps.

Step 400: Start.

Step 402: Receive image frames of a stereo image pair.

Step 404: Select a plurality of feature point correspondence pairs from the image frames.

Step 406: Compute parallax values of the feature point correspondence pairs according to an assumed view order.

Step 408: Refer to the parallax values to count positive parallax values, negative parallax values and zero parallax values, and respectively obtain a first representative value, a second representative value and a third representative value.

Step 410: Compare the third representative value with a predetermined threshold TH1 to generate a comparison result R1.

Step 412: Does the comparison result R1 indicate that the third representative value is smaller than the predetermined threshold TH1? If yes, go to step 414; otherwise, go to step 418.

Step 414: Compare the second representative value with the first representative value to generate a comparison result R2.

Step 416: Does the comparison result R2 indicates that the first representative value is greater than the second representative value. If yes, go to step 422; otherwise, go to step 424.

Step 418: Compare the second representative value with the first representative value to generate the comparison result R2.

Step 420: Does the comparison result R2 indicate that the second representative value is greater than the first representative value. If yes, go to step 422; otherwise, go to step 424.

Step 422: Determine that an actual view order of the image frames of the stereo image pair is an inverse of the assumed view order. Go to step 426.

Step 424: Determine that the actual view order of the image frames of the stereo image pair is the assumed view order.

Step 426: End.

Steps 402-406 are executed to obtain image characteristics by analyzing the image frames according to an assumed view order. In this embodiment, the image characteristics are parallax characteristics. Hence, an initial guess of the view order is made to regard one of the received image frames as a left view and the other of the received image frames as a right view. Based on the assumed view order, the aforementioned formula (1) is used to calculate a parallax value for the same feature point found in the image frames. The number of selected feature point correspondence pairs may be adjusted, depending upon actual design consideration. Besides, to improve the accuracy of the proposed automatic identification scheme, the selected feature points in one image frame should not be clustered in several limited areas. Preferably, the selected feature points are uniformly and randomly distributed in an image frame. It should be noted that the stereo image pair may be derived from performing 3D format detection upon a 3D image input or a 3D video input. That is, the stereo image pair may be a 3D image or extracted from a 3D video bitstream.

In step 408, the first representative value, the second representative value and the third representative value are obtained according to the calculated parallax values. In a preferred embodiment, the first representative value is a percentage value P(+) indicative of the percentage of the positive parallax values included in the parallax values, the second representative value is a percentage value P(−) indicative of the percentage of the negative parallax values included in the parallax values, and the third representative value is a percentage value P(0) indicative of the percentage of the zero parallax values included in the parallax values. However, this is not meant to be a limitation of the present invention. Alternatively, the first representative value may be a count value derived from counting the positive parallax values included in the parallax values, the second representative value may be a count value derived from counting the negative parallax values included in the parallax values, and the third representative value may be a count value derived from counting the zero parallax values included in the parallax values.

After the first representative value derived from the positive parallax values, the second representative value derived from the negative parallax values and the third representative value derived from the zero parallax values are obtained, the actual view order is identified by checking the parallax characteristics. The camera configuration is identified first. In step 408, the third representative value (e.g., P(0)) is compared with a predetermined threshold TH1 to detect whether the third representative value is close to zero. That is, the predetermined threshold TH1 may be set by a positive value close to zero. When the comparison result R1 indicates that the third representative value is smaller than the predetermined threshold TH1, it is determined that the received stereo image pair is produced by a camera configuration using parallel cameras (e.g., 102 and 104 shown in FIG. 1). Otherwise, it is determined that received stereo image pair is produced by a camera configuration using converging cameras (e.g., 202 and 204 shown in FIG. 2).

After the camera configuration is successfully detected, the accuracy of the assumed view order is verified to determine whether the assumed view order is the actual view order. In a case where the parallel camera configuration is detected in step 412, steps 414 and 416 are executed to verify the assumed view order. As shown in above Table 1, all or most of the parallax values of the parallel camera configuration should be negative under the correct view order. In a preferred embodiment, the first representative value is compared with the second representation value. If the comparison result R2 indicates that the first representative value is greater than the second representative value (step 416), this means the assumed view order is wrong. In other words, due to the fact that the assumed view order is different from the actual view order, one of the images is incorrectly regarded as the left view, and the other of the image images is incorrectly regarded as the right view. Hence, the assumed view order is switched/reversed (step 422). In this way, it is determined that the actual view order is an inverse of the assumed view order. However, if the comparison result R2 indicates that the first representative value is not greater than the second representative value (step 416), this means the assumed view order is correct. In other words, due to the fact that the assumed view order is identical to the actual view order, one of the image images is correctly regarded as the left view, and the other of the images is correctly regarded as the right view. Hence, it is determined that the actual view order is the assumed view order (step 424).

In another case where the converging camera configuration is detected in step 412, steps 418 and 420 are executed to verify the assumed view order. As shown in above Table 1, all of the parallax values of the parallel camera configuration should be negative under the correct view order, and a few of the parallax values of the converging camera configuration should be negative under the correct view order. In a preferred embodiment, the first representative value is compared with the second representation value. If the comparison result R2 indicates that the first representative value is smaller than the second representative value (step 420), this means the assumed view order is wrong. In other words, due to the fact that the assumed view order is different from the actual view order, one of the image images is incorrectly regarded as the left view, and the other of the image images is incorrectly regarded as the right view. Hence, the assumed view order is switched/reversed (step 422). In this way, it is determined that the actual view order is an inverse of the assumed view order. However, if the comparison result R2 indicates that the first representative value is not smaller than the second representative value (step 420), this means the assumed view order is correct. In other words, due to the fact that the assumed view order is identical to the actual view order, one of the image images is correctly regarded as the left view, and the other of the image images is correctly regarded as the right view. Hence, it is determined that the actual view order is the assumed view order (step 424).

In most cases, it is assumed that the 3D contents are produced by parallel or converging cameras. However, it is possible that a different case may occur. For example, the 3D content is overlaid on a two-dimensional (2D) content (e.g., a 2D background) to produce the final 3D content. The most common case is adding 3D caption or text on the 2D contents. Although it is possible to have zero, positive and negative parallax values for the 3D contents, in practice, such contents are added in a "pop-up" fashion, meaning that only negative parallax values are present.

Hence, regarding the produced 3D contents having 3D contents overlaid on the 2D background, the percentage of positive parallax values is equal to zero, the zero parallax values account for a majority part, and the negative parallax values account for a small part. For clarity, an overview of the sign distribution of parallax values under the correct view order is shown in Table 3.

TABLE 3

Sign distributions of parallax for special case (correct view order)

| Parallax | Special case (2D + pop-up 3D) |
|---|---|
| Positive | 0 |
| Zero | Many |
| Negative | A few |

If the assumed view order is wrong, the percentage of negative parallax values is equal to zero, the zero parallax values account for a majority part, and the positive parallax values account for a small part. For clarity, an overview of the sign distribution of parallax values under the incorrect view order is shown in Table 4.

TABLE 4

Sign distributions of parallax for special case (incorrect view order)

| Parallax | Special case (2D + pop-up 3D) |
|---|---|
| Positive | A few |
| Zero | Many |
| Negative | 0 |

Figure 5:
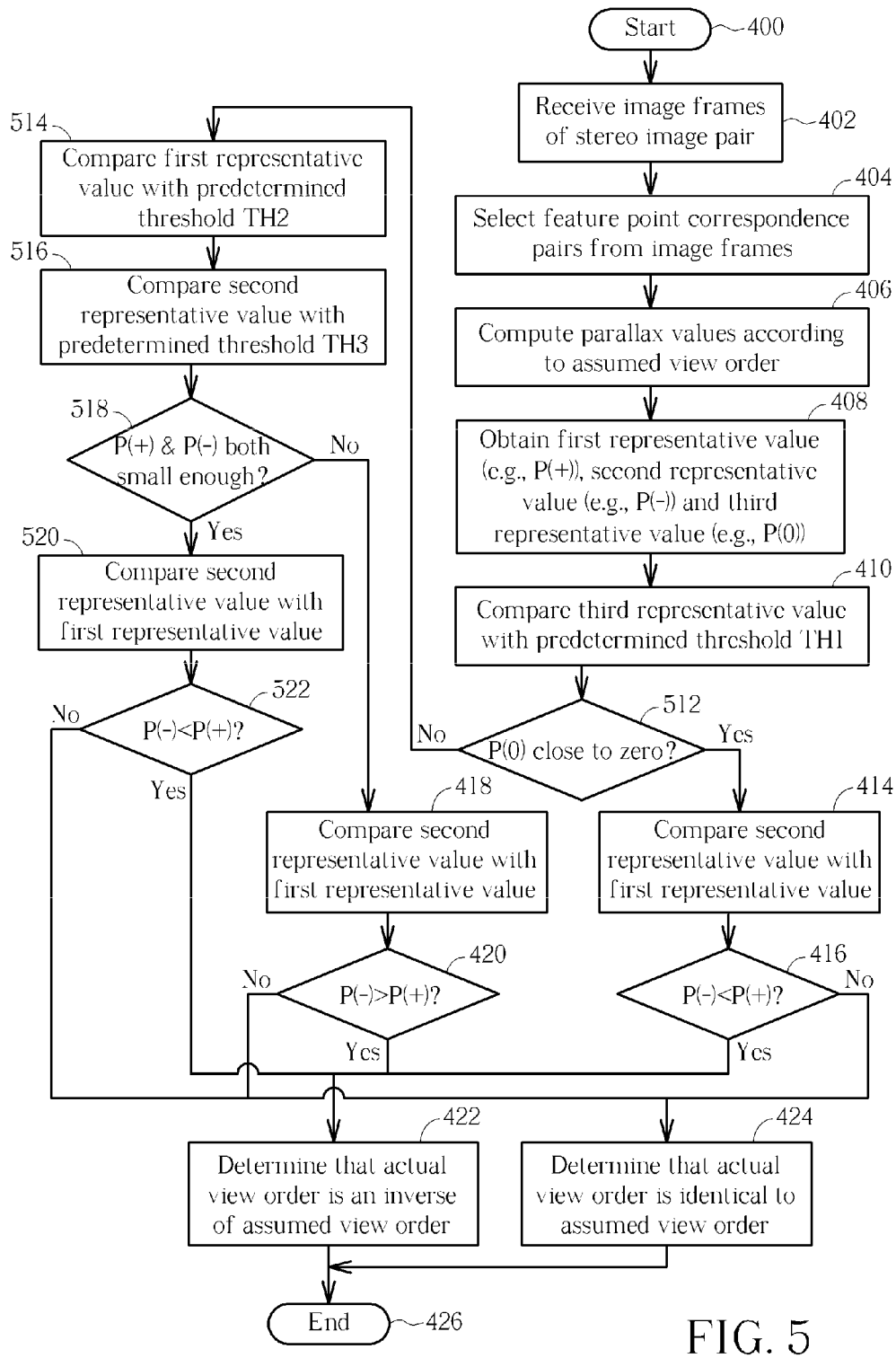
FIG. 5 is a flowchart illustrating a method of identifying a view order of images frames of a stereo image pair according to a second embodiment of the present invention.

To handle this special case, addition steps should be added to the flow shown in FIG. 4. Please refer to FIG. 5, which is a flowchart illustrating a method of identifying a view order of images frames of a stereo image pair according to a second embodiment of the present invention. If the result is substantially the same, the steps are not required to be executed in the exact order shown in FIG. 5. The flowchart shown in FIG. 5 is based on the flowchart shown in FIG. 4. The major difference between the flowcharts shown in FIGS. 4-5 are steps 512-522, as below.

Step 512: Does the comparison result R1 indicate that the third representative value is smaller than the predetermined threshold TH1? If yes, go to step 414; otherwise, go to step 514.

Step 514: Compare the first representative value with a predetermined threshold TH2 to generate a comparison result R3.

Step 516: Compare the second representative value with a predetermined threshold TH3 to generate a comparison result R4.

Step 518: Do the comparison results R3 and R4 indicate that each of the first representative value and the third representative value is smaller than a corresponding predetermined threshold? If yes, go to step 520; otherwise, go to step 418.

Step 520: Compare the second representative value with the first representative value to generate the comparison result R2.

Step 522: Does the comparison result R2 indicates that the second representative value is smaller than the first representative value. If yes, go to step 422; otherwise, go to step 424.

Step 512 replaces the step 412 shown in FIG. 4. Hence, when the converging camera configuration is detected, the flow in FIG. 5 would proceed with steps 514, 516 and 518 to check occurrence of the aforementioned special case. The predetermined thresholds TH2 and TH3 may be set by the same small value. However, this is for illustrative purposes only, and is not meant to be a limitation of the present invention.

As can be readily known from Table 3 and Table 4, when the comparison result R3 indicates that the first representative value is not smaller than the predetermined threshold TH2 and/or the comparison result R4 indicates that the second representative value is not smaller than the predetermined threshold TH3 (i.e., at least one of the negative parallax percentage and positive parallax percentage is large), this implies that the aforementioned special case does not exist. Hence, the flow proceeds with step 418 to check the assumed view order, as mentioned above.

As can be readily known from Table 3 and Table 4, when the comparison result R3 indicates that the first representative value is smaller than the predetermined threshold TH2 and the comparison result R4 indicates that the second representative value is smaller than the predetermined threshold TH3 (i.e., the negative parallax percentage and positive parallax percentage are both small), this implies that the aforementioned special case exists. To more accurately detect the occurrence of the special case, additional step(s) may be executed. For example, it is determined that the special case exists when the negative parallax percentage and positive parallax percentage are both small and one of them is close to zero. Hence, one step may be inserted between steps 520 and 522 to check if one of the first representative value and the second representative value is close to zero by comparing each of the first representative value and the second representative value with a small predetermined threshold. However, with a proper setting of the predetermined thresholds TH2 and TH3, this optional step may be omitted. Specifically, as none of the normal parallel camera configuration and normal converging camera configuration has the parallax value distribution with small negative parallax percentage and small positive parallax percentage, the special case can be identified when each of the first representative value and second representative value is small enough. Next, the flow proceeds with steps 520 and 522 to verify the correctness of the assumed view order.

As shown in Table 3, the special case ideally would have no positive parallax values, and have negative parallax values accounted for a small part. In this embodiment, the first representative value is compared with the second representation value. If the comparison result R2 indicates that the second representative value is smaller than the first representative value (step 522), this means the assumed view order is wrong. In other words, due to the fact that the assumed view order is different from the actual view order, one of the image images is incorrectly regarded as the left view, and the other of the image images is incorrectly regarded as the right view. Hence, the assumed view order is switched/reversed (step 422). In this way, it is determined that the actual view order is an inverse of the assumed view order. However, if the comparison result R2 indicates that the second representative value is not smaller than the first representative value (step 522), this means the assumed view order is correct. In other words, due to the fact of the assumed view order is identical to the actual view order, one of the image images is correctly regarded as the left view, and the other of the image images is correctly regarded as the right view. Hence, it is determined that the actual view order is the assumed view order (step 424).

Figure 6:
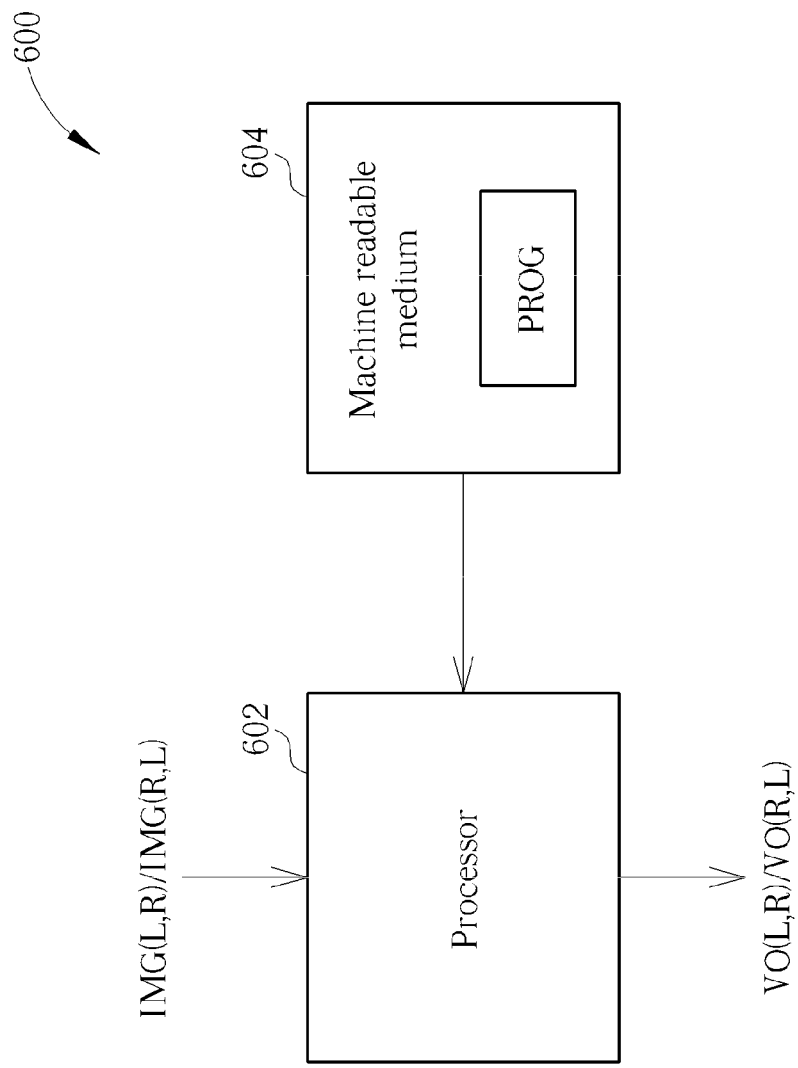
FIG. 6 is a diagram illustrating an image/video processing system according to an embodiment of the present invention.

The automatic identification algorithm shown in FIG. 4/FIG. 5 may be employed by a processor to find the correct view order. FIG. 6 is a diagram illustrating an image/video processing system according to an embodiment of the present invention. The image/video processing system 600 includes a processor 602 and a machine readable medium (e.g., a memory device) 604. The machine readable medium 604 is coupled to the processor 602, and arranged to store a program code PROG. When the program code PROG is loaded and executed by the processor 602, the processor 602 is operative to receive a stereo image pair IMG(L,R)/IMG(R,L) generated from any conventional 3D format detection, and identify the actual view order VO(L,R)/VO(R,L) of the received stereo image pair by performing the steps shown in FIG. 4/FIG. 5. By way of example, the processor 602 may be a central processing unit (CPU) or a micro control unit (MCU), and the program code PROG may be part of firmware of an electronic device (e.g., an Internet TV) in which the image/video processing system 600 is disposed.

Briefly summarized, when the 3D contents do not have any tag information in the file, the proposed automatic identification scheme of the present invention allows the appliance or software to display the left view and the right view in the correct view order with/without switching the left view and the right view. It should be noted that if some 3D contents are produced using computer graphics to have no zero parallax values and more positive parallax values than the negative parallax values, the proposed automatic identification scheme of the present invention would always tell that the correct view order is wrong since the 3D contents are not produced using one of the common camera configurations mentioned above.

Further, using the parallax characteristics to identify the actual view order of image frames of a stereo image pair is for illustrative purposes only. In practice, any automatic identification scheme using image characteristics derived from processing/analyzing image frames of a stereo image pair to identify the actual view order of the image frames of the stereo image pair falls within the scope of the present invention.

Moreover, the flows shown in FIG. 4 and FIG. 5 are for illustrative purposes. That is, numerous modifications and alterations of the method may be made without departing from the spirit of the present invention. For example, regarding two camera configurations having parallax value distributions different from that shown in Table 1/Table 3, the flow shown in FIG. 4/FIG. 5 may be properly modified to achieve the same objective of identifying the actual view order of the received stereo image pair. By way of example, distinguishing between different camera configurations is not limited to comparing percentage of zero parallax values with a predetermined threshold.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for identifying an actual view order of image frames of a stereo image pair, comprising:
   receiving the image frames;
   obtaining image characteristics by analyzing the image frames according to an assumed view order, wherein the step of obtaining the image characteristics comprises:
   selecting a plurality of feature point correspondence pairs from the image frames; and computing parallax values of the feature point correspondence pairs to generate the image characteristics; and identifying the actual view order by checking the image characteristics, wherein the step of identifying the actual view order comprises:

referring to the parallax values to count positive parallax values, negative parallax values and zero parallax values and respectively obtaining a first representative value, a second representative value and a third representative value; and verifying the assumed view order to determine the actual view order according to the first representative value, the second representative value and the third representative value.

2. The method of claim 1, wherein the first representative value indicates a percentage of the positive parallax values in the parallax values, the second representative value indicates a percentage of the negative parallax values in the parallax values, and the third representative value indicates a percentage of the zero parallax values in the parallax values.

3. The method of claim 1, wherein the step of verifying the assumed view order to determine the actual view order comprises:

comparing the third representative value with a first predetermined threshold to generate a first comparison result; and comparing the second representative value with the first representative value to generate a second comparison result; and verifying the assumed view order according to at least the first comparison result and the second comparison result, and accordingly determining the actual view order.

4. The method of claim 3, wherein the step of verifying the assumed view order according to at least the first comparison result and the second comparison result comprises:

when the first comparison result indicates that the third representative value is smaller than the first predetermined threshold, and the second comparison result indicates that the first representative value is not greater than the second representative value, determining that the actual view order is the assumed view order; and when the first comparison result indicates that the third representative value is smaller than the first predetermined threshold, and the second comparison result indicates that the first representative value is greater than the second representative value, determining that the actual view order is an inverse of the assumed view order.

5. The method of claim 3, wherein the step of verifying the assumed view order according to at least the first comparison result and the second comparison result comprises:

when the first comparison result indicates that the third representative value is not smaller than the first predetermined threshold, and the second comparison result indicates that the second representative value is not greater than the first representative value, determining that the actual view order is the assumed view order; and when the first comparison result indicates that the third representative value is not smaller than the first predetermined threshold and the second comparison result indicates that the second representative value is greater than the first representative value, determining that the actual view order is an inverse of the assumed view order.

6. The method of claim 3, wherein the step of verifying the assumed view order to determine the actual view order further comprises:

comparing the first representative value with a second predetermined threshold to generate a third comparison result;

comparing the second representative value with a third predetermined threshold to generate a fourth comparison result; and the step of verifying the assumed view order according to at least the first comparison result and the second comparison result comprises:

verifying the assumed view order according to at least the first comparison result, the second comparison result, the third comparison result and the fourth comparison result.

7. The method of claim 6, wherein the step of verifying the assumed view order according to at least the first comparison result, the second comparison result, the third comparison result and the fourth comparison result comprises:

when the first comparison result indicates that the third representative value is not smaller than the first predetermined threshold, the third comparison result and the fourth comparison result indicate that each of the first representative value and the second representative value is smaller than a corresponding predetermined threshold, and the second comparison result indicates that the second representative value is not smaller than the first representative value, determining that the actual view order is the assumed view order; and when the first comparison result indicates that the third representative value is not smaller than the first predetermined threshold, the third comparison result and the fourth comparison result indicate that each of the first representative value and the second representative value is smaller than the corresponding predetermined threshold, and the second comparison result indicates that the second representative value is smaller than the first representative value, determining that the actual view order is an inverse of the assumed view order.

8. The method of claim 6, wherein the step of verifying the assumed view order according to at least the first comparison result, the second comparison result, the third comparison result and the fourth comparison result comprises:

when the first comparison result indicates that the third representative value is not smaller than the first predetermined threshold, the third comparison result and the fourth comparison result indicate that at least one of the first representative value and the second representative value is not smaller than a corresponding predetermined threshold, and the second comparison result indicates that the second representative value is not greater than the first representative value, determining that the actual view order is the assumed view order; and when the first comparison result indicates that the third representative value is not smaller than the first predetermined threshold, the third comparison result and the fourth comparison result indicate that at least one of the first representative value and the second representative value is not smaller than the corresponding predetermined threshold, and the second comparison result indicates that the second representative value is greater than the first representative value, determining that the actual view order is an inverse of the assumed view order.

9. A non-transitory machine readable medium storing a program code, wherein the program code causes a processor to perform the following steps for identifying an actual view order of image frames of a stereo image pair when executed by the processor:

receiving the image frames;

obtaining image characteristics by analyzing the image frames according to an assumed view order, wherein the step of obtaining the image characteristics comprises:

selecting a plurality of feature point correspondence pairs from the image frames; and computing parallax values of the feature point correspondence pairs to generate the image characteristics; and identifying the actual view order by checking the image characteristics, wherein the step of identifying the actual view order comprises:

referring to the parallax values to count positive parallax values, negative parallax values and zero parallax values, and respectively obtaining a first representative value, a second representative value and a third representative value; and verifying the assumed view order to determine the actual view order according to the first representative value, the second representative value and the third representative value.

10. The non-transitory machine readable medium of claim 9, wherein the first representative value indicates a percentage of the positive parallax values in the parallax values, the second representative value indicates a percentage of the negative parallax values in the parallax values, and the third representative value indicates a percentage of the zero parallax values in the parallax values.

11. The non-transitory machine readable medium of claim 9, wherein the step of verifying the assumed view order to determine the actual view order comprises:

comparing the third representative value with a first predetermined threshold to generate a first comparison result; and comparing the second representative value with the first representative value to generate a second comparison result; and verifying the assumed view order according to at least the first comparison result and the second comparison result, and accordingly determining the actual view order.

12. The non-transitory machine readable medium of claim 11, wherein the step of verifying the assumed view order according to at least the first comparison result and the second comparison result comprises:

when the first comparison result indicates that the third representative value is smaller than the first predetermined threshold, and the second comparison result indicates that one of the first representative value and third representative value is not greater than the second representative value, determining that the actual view order is the assumed view order; and when the first comparison result indicates that the third representative value is smaller than the first predetermined threshold, and the second comparison result indicates that the first representative value is greater than the second representative value, determining that the actual view order is an inverse of the assumed view order.

13. The non-transitory machine readable medium of claim 11, wherein the step of verifying the assumed view order according to at least the first comparison result and the second comparison result comprises:

when the first comparison result indicates that the third representative value is not smaller than the first predetermined threshold, and the second comparison result indicates that the second representative value is not greater than the first representative value, determining that the actual view order is the assumed view order; and when the first comparison result indicates that the third representative value is not smaller than the first predetermined threshold and the second comparison result indicates that the second representative value is greater than the first representative value, determining that the actual view order is an inverse of the assumed view order.

14. The non-transitory machine readable medium of claim 11, wherein the step of verifying the assumed view order to determine the actual view order further comprises:

comparing the first representative value with a second predetermined threshold to generate a third comparison result;

comparing the second representative value with a third predetermined threshold to generate a fourth comparison result; and the step of verifying the assumed view order according to at least the first comparison result and the second comparison result comprises:

verifying the assumed view order according to at least the first comparison result, the second comparison result, the third comparison result and the fourth comparison result.

15. The non-transitory machine readable medium of claim 14, wherein the step of verifying the assumed view order according to at least the first comparison result, the second comparison result, the third comparison result and the fourth comparison result comprises:

when the first comparison result indicates that the third representative value is not smaller than the first predetermined threshold, the third comparison result and the fourth comparison result indicate that each of the first representative value and the second representative value is smaller than a corresponding predetermined threshold, and the second comparison result indicates that the second representative value is not smaller than the first representative value, determining that the actual view order is the assumed view order; and when the first comparison result indicates that the third representative value is not smaller than the first predetermined threshold, the third comparison result and the fourth comparison result indicate that each of the first representative value and the second representative value is smaller than the corresponding predetermined threshold, and the second comparison result indicates that the second representative value is smaller than the first representative value, determining that the actual view order is an inverse of the assumed view order.

16. The non-transitory machine readable medium of claim 14, wherein the step of verifying the assumed view order according to at least the first comparison result, the second comparison result, the third comparison result and the fourth comparison result comprises:

when the first comparison result indicates that the third representative value is not smaller than the first predetermined threshold, the third comparison result and the fourth comparison result indicate that at least one of the first representative value and the second representative value is not smaller than a corresponding predetermined threshold, and the second comparison result indicates that the second representative value is not greater than the first representative value, determining that the actual view order is the assumed view order; and when the first comparison result indicates that the third representative value is not smaller than the first predetermined threshold, the third comparison result and the fourth comparison result indicate that at least one of the first representative value and the second representative value is not smaller than the corresponding predetermined threshold, and the second comparison result indicates that the second representative value is greater than the first representative value, determining that the actual view order is an inverse of the assumed view order.

* * * * *